W. G. SKINNER.
METHOD OF AND APPARATUS FOR TESTING CEMENT.
APPLICATION FILED APR. 17, 1918.
1,309,702.
Patented July 15, 1919.
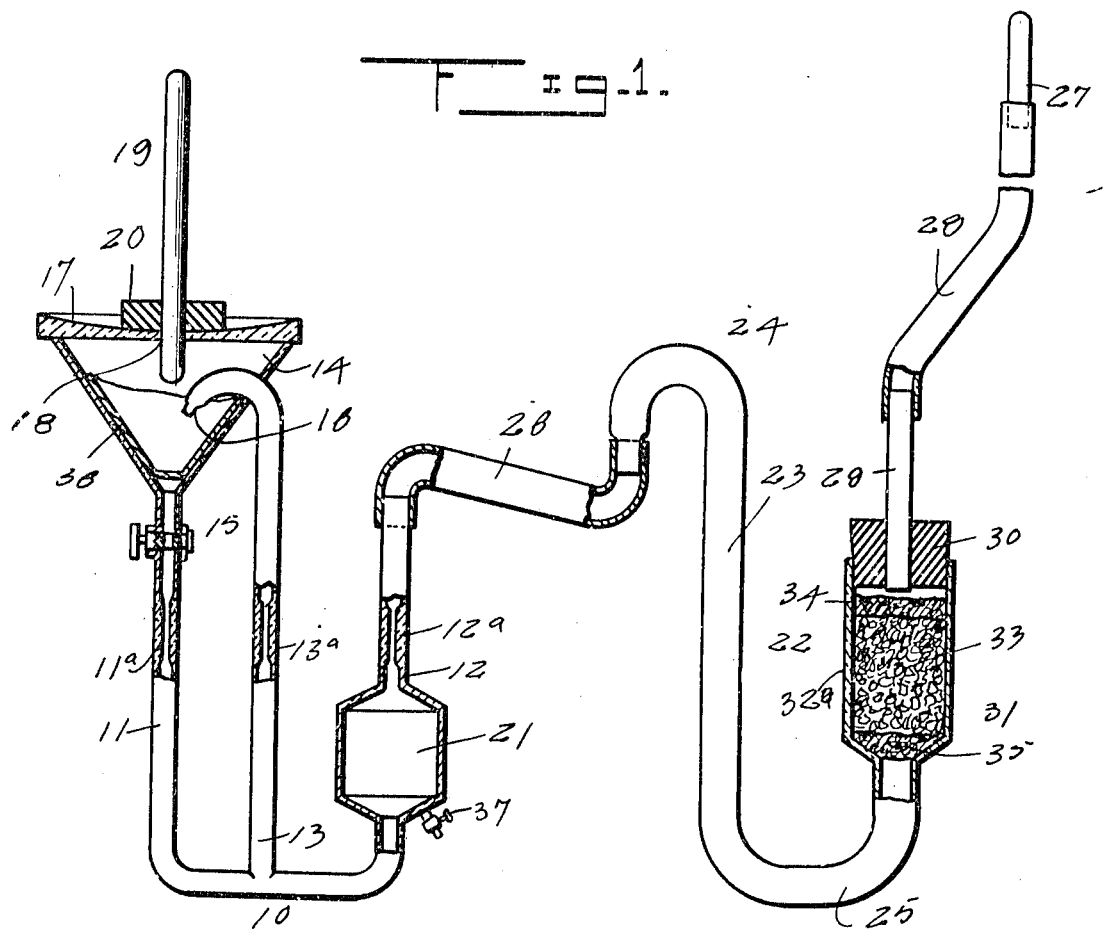
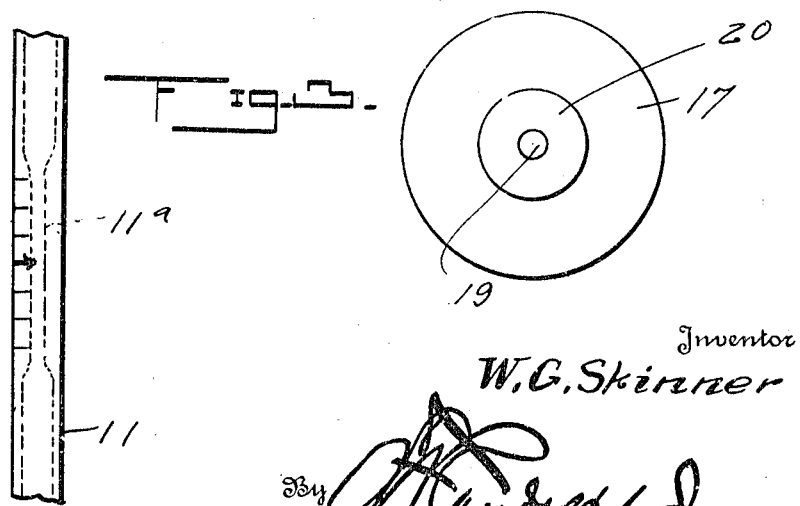
Witnesses
C. R. Beall
V. M. Keese
Inventor
W. G. Skinner
By _____ Attorney

UNITED STATES PATENT OFFICE.

WILLIAM G. SKINNER, OF YORKTOWN, VIRGINIA.

METHOD OF AND APPARATUS FOR TESTING CEMENT.

1,309,702.   Specification of Letters Patent.   Patented July 15, 1919.

Application filed April 17, 1918. Serial No. 229,117.

*To all whom it may concern:*

Be it known that I, WILLIAM G. SKINNER, a citizen of the United States, residing at Yorktown, in the county of York and State of Virginia, have invented certain new and useful Improvements in Methods of and Apparatus for Testing Cement; and I do hereby declare the following to be a full, clear, and exact description of the invention, such as will enable others skilled in the art to which it appertains to make and use the same.

The object of the invention is to provide a simple, and efficient method of and apparatus for testing cement to determine the coefficient of fineness thereof as a means of determining its strength from an engineering standpoint, and applicable not only to cement proper but to other materials used in connection with building as for example Portland cement, hydrated limes, sands of all kinds, crushed rock and the like. Various means and methods have been employed heretofore to determine with greater or less approximation the suitability of material of a powdered, ground, pulverized, crushed, granular and crystalline formation, but they have been more or less deficient in one particular or another or as applied to one material or another, and therefore have not been as reliable as a guide to the engineer or contractor as is desirable, particularly in certain kinds of work, and the object of this invention is to provide a means and method of testing whereby approximate accuracy and reliability, as well as uniformity of results, may be secured.

Further objects and advantages are in view as will appear in the course of the following description, and in carrying out the method to be described there may be employed an apparatus of which one embodiment is shown herein, it being understood however that changes in the same may be resorted to within the scope of the appended claims without departing from the spirit of the invention.

In the drawings:

Figure 1 is a side view partly in section of a simple form of apparatus embodying the essential features regarded as desirable in this connection.

Figs. 2 and 3 are detail views of elements of the apparatus.

The illustrated apparatus consists essentially of a gage glass or member 10 of substantially U-form having the substantially parallel legs 11 and 12 and an intermediate discharge tube 13. In communication with the leg 11, which may be designated as the inlet leg or tube of the member, is a funnel 14 which may be cut off from the leg by means of a valve or cutoff 15 for the purpose hereinafter indicated, while the intermediate or discharge element or leg 13 is provided with a reduced nozzle 16 in communication with the funnel. Also the funnel is provided with a removable cap or cover plate 17, preferably of glass and concaved substantially in the manner of a watch crystal which may conveniently be employed in this connection. Centrally said cap or cover plate or disk is provided with an opening 18 through which extends a mixer or stirrer rod 19 preferably of glass and held at the desired adjustment in the opening of the cap or cover by means of a packing disk or washer 20 consisting of rubber or of cork or similar material which will exert a frictional adherence upon the rod and maintain it at a given projection at its lower end into the interior of the funnel while permitting said rod to be used as a means of stirring or mixing the contents of said funnel as hereinafter explained.

At intermediate points and in a common horizontal level each of the tubular members 11, 12 and 13 is provided with a constricted or reduced bore or portion designated as 11$^a$, 12$^a$ and 13$^a$ for the purpose of increasing the sensitiveness of measurement of volumes of the contents of the gage glass as will also be explained later. Also in a common level and arranged in the restricted zones of the said tubes 11, 12 and 13 there are arranged indexes or pointers, and correspondingly if desired these restricted portions of the tubes may be graduated in accordance with any suitable unit of measurement of volume, such as a cubic centimeter, but this is only incidental and not absolutely necessary to the utility of the device as hereindescribed.

In communication with the leg 12 of the gage member and formed as an enlargement thereof is a reservoir 21, located below the constricted portion 12$^a$ of said tube, while in communication with the upper open end of said tube 12$^a$ is a blow pipe or pressure tube or apparatus 22, consisting in the construction illustrated of a main tube 23 having terminal stems or elbows 24 and 25, the former of which is connected by a rubber tube 26 with the upper extremity of said gage element 12 while the latter is in communication with a mouth piece 27 by means of which a pressure of air may be introduced to the upper end of said gage tube 12, as hereinafter explained. Preferably the mouth tube or piece 27 is connected by flexible tubing 28 with the extremity of a tube 29, preferably of glass, which is seated in a cork or stopper 30 forming the top or cover of a dehydrator 31, consisting of a receptacle 32 in communication with the lower bend or elbow 25 of the pressure tube and provided with a filling of dehydrating material such as calcium chlorid shown at 33, above and below which may be arranged packing and absorbent layers of cotton 34 and 35.

It is necessary in carrying out the process of this invention, in connection with the above described apparatus or any equivalent thereof, to adopt a stock solution or liquid of a quality or characteristic which will cause it to adhere to particles of a powdered or granular material, and it has been found that kerosene, dehydrated, is suitable for the purpose. In connection with this solution it is necessary to adopt or prepare a scale of weights per unit volume at different temperatures. Of course, any suitable mechanism or apparatus may be used in this connection, the object being to determine for example how much one cubic centimeter of kerosene (assuming that this material is adopted as the stock solution) will weigh at different temperatures covering the range of possible temperatures under which tests of the cement or cementitious material will be made, so that said scale may be in readiness for reference at any time in connection with the test. With this preparation the procedure in connection with a test is substantially as follows:

The gage element is first charged with the stock solution up to the level of the corresponding indexes on the several tubes or legs, and a filter paper as shown 36 is arranged in the funnel beneath the outlet or nozzle of the tube 13 and is thoroughly saturated with said solution, for example by blowing or applying air pressure through the pressure apparatus to cause a sufficient discharge of the solution from said nozzle 16 upon the paper forming the filter. If the filter paper is first held manually in place until it becomes saturated, it will then maintain its position in substantial adherence to the surface of the funnel, but without such adherence as will involve any question of a suction or siphoning action due to the communication of the tube 11 with said funnel. After the filter has been thoroughly saturated, the liquid contents of the gage member should then be reduced until the level is accurately at the aforesaid corresponding indexes on the three tubes 11, 12 and 13, this adjustment being conveniently effected by opening the faucet or drawoff cock 37 which is in communication with the reservoir 21 near the bottom. A carefully weighed sample of the cement or cementitious material to be tested is then deposited in the filter within the funnel and the top or cover plate is replaced with the mixer or stirrer rod projecting downwardly into said cement, the insertion of the latter being accomplished carefully so as not to disturb its adjustment in the top or cover plate or unnecessarily disturb the said material to be tested. This having been accomplished, pressure should again be applied to the blow pipe to force a certain amount of the stock solution downwardly through the tube 12 and upwardly through the tube 13 into the funnel, the cutoff 15 being closed. This operation should be continued until the contents of the funnel have been thoroughly saturated, and to insure this the stirrer or mixer rod may be employed, so that every particle of the granular or powdered contents may receive a coating of the said solution. The operation of injecting the solution into the funnel may be repeated as frequently as necessary in order to insure the proper saturation of the contents of the funnel and then should be discontinued and the material allowed to drain, retaining only so much of the solution as is held by actual contact with and adherence to the particles of powder or granular material therein, the cutoff 15 being open during the latter portion of said operation in order to permit the drainage from the material in the funnel to return to the gage member. When this has been accomplished, the level of the solution in the gage member obviously will be lower than the indexes, and thereupon a quantity of the solution should be introduced into the gage member through the tube 12 (the blow pipe apparatus being detached for that purpose) and the quantity introduced should be accurately measured as by means of any volume measure such as a burette or the equivalent thereof, so that the quantity of material necessary to bring the solution back to the original level may be determined accurately by the same unit of measure as adopted as for example cubic centimeters. Obviously the amount thus introduced by volume represents the amount which has been held by the cement in the funnel measured in cubic centimeters. If now this amount is multiplied by the weight, for example in grams, of a cubic centimeter of the solution at the temperature indicated by the scale as corresponding with the temperature at which the test is being made, and this result is divided by the weight in grams (or other unit) of the cement placed as a sample in the funnel, and the result thereof multiplied by one hundred, the product will be the percentage or the coefficient of fineness of the material due to the fact that a powdered or granular material, in accordance with its fineness will mechanically hold a greater or less amount of kerosene or similar solution, the amount held being in direct proportion to the fineness owing to the increased aggregate surface or area of the material exposed for contact with the solution. In other words, the finer the powder or granular structure the greater will be the surface area exposed and therefore the more of the solution will be held mechanically thereby, and this proportion is uniform, so that the percentage or the coefficient of fineness can be determined with great nicety by following the course outlined. Obviously, for extreme accuracy the filter paper after saturation by the stock liquid should be allowed to drain thoroughly to remove all superfluous liquid before adjusting the level in gage glass preparatory to introducing the cement to the funnel, and after the charging of the cement by the contents of the glass, a sufficient drainage period should be allowed to lapse before taking measurement of the amount of liquid remaining in the glass, so that only the liquid which actually adheres to the surfaces of the particles of the cement may remain in the funnel, the surplus running back into the glass.

Also, obviously the comparison by weight, to determine the exposed areas of the particles of cement must be made at corresponding temperatures in accordance with the scale, it being clear that at a higher temperature the greater fluidity of the solution will cause less to adhere to the same surface, proportionately, than would be retained by adhesion with the liquid at a lower temperature. The temperature being ascertained at the time of the test, therefore, it is only necessary to refer to the scale of comparative weights and temperatures, to select that weight factor which corresponds with the given temperature.

To produce a convenient standard scale proceed as follows:

Ascertain the temperature at which the oil (or other selected stock solution) will weigh exactly eight-tenths (.8) gram to the cubic centimeter (cc.) or in other words will have a specific gravity of .8, compared with water (the universal standard for specific gravities) at 4 degrees centigrade which will weigh one gram per cubic centimeter. Develop this scale to the desired extent to determine how much one cubic centimeter will weigh at other temperatures and tabulate the findings. Then as the density of oil and hence its specific gravity will diminish as the temperature rises and will increase as the temperature is lowered, multiply the number of cubic centimeters held by the sample by eight-tenths over X—that is $\frac{.8}{X}$, where X is the weight of 1 cc. at the temperature of the test. This will give the amount in cubic centimeters the sample would hold if the solution weighed eight-tenths gram per cc., and this multiplied by .8 will give actual weight in grams of oil held, and this divided by actual weight of sample and multiplied by one hundred will give percentage coefficient of fineness.

Having fully described the invention, what is claimed is:

1. The method of determining the coefficient of fineness of comminuted mineral substances which consists in applying to the surface areas of a definite quantity of said material an adherent coating of a liquid of known specific gravity and measuring the quantity of liquid so held.

2. A method of determining the coefficient of fineness of comminuted mineral substances which consists in saturating a definite quantity of the material with a known quantity of liquid, drawing off the surplus, and determining the quantity of liquid left adhering.

3. An apparatus for the purpose described having a gage member for containing a given quantity of a stock solution, filtering means for holding a measured quantity of a comminuted material and draining into said gage member, and means for discharging a portion of said solution from the gage member into the filtering means to saturate the mass of said material therein and form an adherent surface coating for the particles of the material, the extent of surface area of the material being indicated by the measured difference between the quantities of solution in the gage member before and after such saturation.

4. An apparatus for the purpose described having a gage member consisting of a plurality of connected tubular elements provided with common level indicating means, a filter holding funnel discharging into one of said elements, and a pressure device communicating with another of said elements, a third element of said gage member being provided with an outlet to discharge liquid contents of the gage member into the funnel.

5. An apparatus for the purpose described having a gage member consisting of a plurality of connected tubular elements provided with common level indicating means, the bores of said elements being constricted adjacent to said indicating means, a filter holding funnel discharging into one of said elements, and a pressure device in communication with another of said elements, a third element being provided with a discharge nozzle arranged within the funnel above the bottom thereof.

6. An apparatus for the purpose described having a gage member consisting of a plurality of connected tubular elements provided with common level indicating means, a filter holding funnel discharging into one of said elements, a cutoff valve for the element in connection with which said funnel is arranged, pressure applying means in communication with another of said elements, a third of said elements being provided with a discharge outlet in communication with the interior of the funnel, and an outlet or drawoff faucet being in communication with said gage member below the said level indicating means.

7. An apparatus for the purpose described having a gage member consisting of a plurality of connected tubular elements provided with common level indicating means, one of said elements having a communicating filter holding funnel and a cutoff valve for controlling communication between said element and the funnel, and another of said elements being provided with an enlargement forming a reservoir provided with a drawoff cock below the plane of said level indicating means, and a third of said elements being provided with a discharge nozzle arranged within the said funnel, and means for applying fluid pressure to the contents of said gage member to produce a discharge thereof into the funnel.

8. An apparatus for the purpose described having a gage member consisting of a plurality of connected tubular elements provided with common level indicating means, one of said elements having a terminal filter receiving funnel and an adjacent cutoff valve, another of said elements being provided with a discharge nozzle in communication with the funnel, and a third of said elements having an attached pressure applying means, and a removable cover for the funnel having a mixer or stirrer rod adjustably mounted thereon and projecting into the said funnel.

In testimony whereof I affix my signature in presence of two witnesses.

WILLIAM G. SKINNER.

Witnesses:
CONWAY H. SHIELDS,
J. S. DENENFVILLE.